US007953232B2

(12) United States Patent
Miyazaki

(10) Patent No.: US 7,953,232 B2
(45) Date of Patent: May 31, 2011

(54) GUIDING DEVICE AND METHOD OF CONTROLLING THE SAME

(75) Inventor: Shinichi Miyazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1113 days.

(21) Appl. No.: 11/685,647

(22) Filed: Mar. 13, 2007

(65) Prior Publication Data

US 2007/0217616 A1 Sep. 20, 2007

(30) Foreign Application Priority Data

Mar. 14, 2006 (JP) ................................ 2006-068816
Feb. 13, 2007 (JP) ................................ 2007-032556

(51) Int. Cl.
*H04B 3/00* (2006.01)

(52) U.S. Cl. .............. 381/77; 381/79; 381/81; 381/111; 381/387; 381/123; 367/92

(58) Field of Classification Search .............. 381/77–82, 381/85, 111, 387, 123; 367/92
See application file for complete search history.

(56) References Cited

U.S. PATENT DOCUMENTS

| | | | | |
|---|---|---|---|---|
| 7,062,050 | B1 * | 6/2006 | Pompei | 381/77 |
| 7,424,118 | B2 * | 9/2008 | Mori et al. | 381/77 |
| 7,529,376 | B2 * | 5/2009 | Konagai | 381/97 |
| 7,804,971 | B2 * | 9/2010 | Matsuzawa | 381/191 |
| 2004/0114770 | A1 * | 6/2004 | Pompei | 381/77 |
| 2007/0183618 | A1 * | 8/2007 | Ishii et al. | 381/387 |

FOREIGN PATENT DOCUMENTS

| | | |
|---|---|---|
| JP | 07-295637 | 11/1995 |
| JP | 2002-204492 | 7/2002 |

* cited by examiner

*Primary Examiner* — Devona E Faulk
*Assistant Examiner* — Disler Paul
(74) *Attorney, Agent, or Firm* — Workman Nydegger

(57) ABSTRACT

A guiding device controls the directivity of a sound that is reproduced from a speaker in accordance with an attribute of contents.

5 Claims, 8 Drawing Sheets

| ID | ATTRIBUTE | VOICE DATA |
|---|---|---|
| 101 | Private | VOICE DATA 1 |
| 102 | Public | VOICE DATA 2 |

⋮

FIG. 5

GUIDING DEVICE AND METHOD OF CONTROLLING THE SAME

BACKGROUND

1. Technical Field

The present invention relates to a guiding device using a directional speaker that is capable of reproducing a sound having a very high directivity and a method of controlling the same.

2. Related Art

As information apparatuses are being developed and their uses are becoming widely spread, it is common to hear a multitude of sounds from various information apparatuses, especially, in public areas. However, unwanted sound or announcements cause confusion and discomfort to people who do not wish to hear the sound and announcements, and it becomes a cause of stress. Therefore, in public areas, it is highly desirable to reduce noise in the neighboring area, and improve the environment in theses area in terms of sound. For example, if voice information for advertisement or announcements is provided only in a specific area (area on-demand), the reduction of the noise in the neighboring area and the improvement of the effectiveness of announcements can be expected.

Generally, there are two purposes for voice guidance or audio advertisement. One is to provide advertising information to a targeted audience or in a specific area (private information), and the other is to announce them in a relatively wide area (public information).

In the former case, a directional speaker that is capable of reproducing high directivity sounds, such as an ultrasonic speaker (see, JP-A-2002-204492), has been receiving much attention. The ultrasonic speaker outputs a modulated signal that is modulated from an ultrasonic carrier wave by an audible acoustic signal, and thus is capable of reproducing high directivity sounds. Therefore, the ultrasonic speaker can be used for a local announcement such as a tour guide in an art museum.

Further, recently, a guide robot that changes guide (supplying) information (contents) according to a situation has been suggested (see JP-A-7-295637).

However, speakers used in a guiding device or a robot according to the related art function as the directional speaker or the loudspeaker, not both functions. Further, even though both the directional speaker and the loudspeaker can be mounted therein, in such a case, the size of the speakers and a system for dividing driving circuits and the speakers becomes larger, which consequently increases the manufacturing cost.

SUMMARY

An advantage of some aspect of the invention is that it provides a guiding device and a method of controlling the same that is capable of providing a voice guidance using any of very high directivity sound (directional speaker) and a low directivity sound (loudspeaker), and changing the type of supplied speakers according to the situation.

A guiding device according to an aspect of the invention controls the directivity of a sound that is to be reproduced from a speaker in accordance with an attribute of contents.

The guiding device with this configuration uses a speaker that is capable of simultaneously reproducing a sound having a directivity and a sound having no directivity (for example, a directional speaker that uses an ultrasonic transducer), and selects an operation mode that produces the sound having a directivity or an operation mode that produces the sound having no directivity in accordance with the attribute of the contents to be reproduced, and reproduces the sound having a directivity or the sound having no directivity.

Therefore, it is possible to select a function of a directional speaker or a function of a loud speaker in accordance with the attribute of the voice guidance, as appropriate. As a result, the following advantages can be obtained. First, when providing guidance information, it is possible to prevent the confusion and erroneous assumption of the audience. Second, it is possible to provide a proper guidance for the target audience and thus increasing the effectiveness of the provided guidance. Third, it is possible to reduce noise transmitted to the neighboring areas.

Further, since it is possible to realize a function of a directional speaker and a function of a loudspeaker using a single speaker, it is possible to reduce the size of the guiding device.

A guiding device according to another aspect of this invention includes a carrier wave generating unit that generates and outputs an ultrasonic carrier wave, a modulating unit that modulates the ultrasonic carrier wave output from the carrier wave generating unit with an input audible voice signal, a switching unit that selects and outputs the modulated signal output from the modulating unit or the input voice signal, an ultrasonic transducer that is capable of being operated in both a first operation mode that reproduces a sound having a directivity and a second operation mode that reproduces a sound having no directivity, and is driven by a signal output from the switching unit to reproduce a signal sound, and an attribute discriminating unit that receives voice guidance information including attribute data and voice data, outputs the voice data to the modulating unit and the switching unit as a voice signal, discriminates the attribute of the voice guidance information, and controls the switching unit so as to select the first operation mode or the second operation mode in accordance with the attribute.

With this configuration, an ultrasonic carrier wave is generated by the carrier wave generating unit, and the modulating unit modulates the ultrasonic carrier wave output from the carrier wave generating unit with an input audible voice signal. The switching unit selects and outputs the modulated signal output from the modulating unit or the input voice signal.

The ultrasonic transducer can be operated in both a first operation mode that reproduces a sound having a directivity and a second operation mode that reproduces a sound having no directivity, and is driven by a signal output from the switching unit to reproduce a signal sound.

Further, the attribute discriminating unit receives voice guidance information that is contents including attribute data and voice data, outputs the voice data to the modulating unit and the switching unit as a voice signal, discriminates the attribute of the voice guidance information, and controls the switching unit so as to select the first operation mode or the second operation mode in accordance with the attribute to select a signal to be supplied to the ultrasonic transducer.

Therefore, it is possible to select a function of a directional speaker or a function of a loud speaker in accordance with the attribute of the voice guidance, as appropriate. As a result, the following advantages can be obtained. First, when providing guidance information, it is possible to prevent the confusion and erroneous assumption of the audience. Second, it is possible to provide the proper guidance for the target audience and thus the sense of security can be enhanced. Third, it is possible to reduce noise transmitted to the neighboring areas.

Further, since it is possible to realize a function of a directional speaker and a function of a loudspeaker using a single speaker, it is possible to reduce the size of the guiding device.

The guiding device may further include an ID identifying unit that identifies a personal ID or an ID for a specific area, a voice guidance information outputting unit that stores the voice guidance information that is previously associated with each of the IDs, and outputs the voice guidance information that corresponds to an ID identified by the ID identifying unit to the attribute discriminating unit, a position identifying unit that identifies the position where the ID identified by the ID identifying unit is present, and outputs a position command, and an actuator that controls so as to match a sound emitting direction of the ultrasonic transducer with the position where the ID identified by the ID identifying unit is present, on the basis of the position command output from the position identifying unit.

In the guiding device with this configuration, the ID identifying unit identifies a personal ID or an ID for a specific area. The voice guidance information that is previously associated with each of the IDs is stored in the voice guidance information outputting unit, and the voice guidance information that corresponds to an ID identified by the ID identifying unit is output to the attribute discriminating unit.

Further, the position where the ID identified by the ID identifying unit is present is identified by the position identifying unit and the position identifying unit outputs the position command to the actuator that controls the sound emitting direction of the ultrasonic transducer.

The actuator drives and controls the ultrasonic transducer so as to match a sound emitting direction of the ultrasonic transducer with the position where the ID identified by the ID identifying unit is present, on the basis of the position command output from the position identifying unit.

Therefore, it is possible to allow a voice guidance beam to precisely follow the target audience in accordance with the movement of the audience, and thus it is possible to effectively provide the voice guidance.

A guiding device according to still another aspect of the invention includes a carrier wave generating unit that generates and outputs an ultrasonic carrier wave, a modulating unit that modulates the ultrasonic carrier wave output from the carrier wave generating unit with an input audible voice signal, a level adjusting unit that adjusts a level ratio of the modulated signal output from the modulating unit and the voice signal, an attribute discriminating unit that receives voice guidance information that is contents including attribute data and voice data, outputs the voice data to the modulating unit and the level adjusting unit as a voice signal, discriminates the attribute of the voice guidance information, and generates a level ratio command so as to change the level ratio of the modulated signal and the voice signal in accordance with the attribute to output to the level adjusting unit, a mixer that composes the modulated signal and the voice signal whose levels are adjusted by the level adjusting unit to output a composite wave, and an ultrasonic transducer that is capable of reproducing both a sound having a directivity and a sound having no directivity and is driven by a signal output from the mixer to reproduce a signal sound.

In the guiding device with this configuration, an ultrasonic carrier wave is generated by the carrier wave generating unit, and the modulating unit modulates the ultrasonic carrier wave output from the carrier wave generating unit with an input audible voice signal. Further, the level ratio of the modulated signal output from the modulating unit and the voice signal output from the attribute discriminating unit is adjusted by the level adjusting unit and a composite wave that composes the modulated signal and the voice signal whose levels are adjusted by the level adjusting unit is generated by the mixer. The ultrasonic transducer can reproduce both a sound having a directivity and a sound having no directivity and is driven by a signal of the composite wave output from the mixer to reproduce a signal sound.

Further, the attribute discriminating unit generates a level ratio command so as to change the level ratio of the modulated signal and the voice signal in accordance with the attribute information to output to the level adjusting unit.

Therefore, by adjusting the level ratio of the modulated signal and the voice signal, it is possible to change a directivity angle of the sound output. As the ratio of the modulated signal becomes larger, the directivity becomes higher. In contrast, as the ratio of the voice signal becomes larger, the directivity becomes lower. Further, it is possible to adjust the directivity angle of the sound output in consideration of the attribute of the voice guidance information (contents).

The guiding device may further include an ID identifying unit that identifies a personal ID or an ID for a specific area, a voice guidance information outputting unit that stores the voice guidance information that is previously associated with each of the IDs, and outputs the voice guidance information that corresponds to an ID identified by the ID identifying unit to the attribute discriminating unit, a position identifying unit that identifies the position where the ID identified by the ID identifying unit is present, and outputs the position command, and an actuator that controls so as to match a sound emitting direction of the ultrasonic transducer with the position where the ID identified by the ID identifying unit is present, on the basis of the position command output from the position identifying unit.

In the guiding device with this configuration, the ID identifying unit identifies a personal ID or an ID for a specific area. The voice guidance information that is previously associated with each of the IDs is stored in the voice guidance information outputting unit, and the voice guidance information that corresponds to an ID identified by the ID identifying unit is output to the attribute discriminating unit.

Further, the position where the ID identified by the ID identifying unit is present is identified by the position identifying unit and the position identifying unit outputs the position command to the actuator that controls the sound emitting direction of the ultrasonic transducer.

The actuator drives and controls the ultrasonic transducer so as to match a sound emitting direction of the ultrasonic transducer with the position where the ID identified by the ID identifying unit is present, on the basis of the position command output from the position identifying unit.

Therefore, it is possible to allow a voice guidance beam to precisely follow the target audience in accordance with the movement of the audience, and thus it is possible to effectively provide the voice guidance.

Furthermore, by adjusting the level of the modulated signal and the level of the voice signal, it is possible to change a directivity angle of the sound output. As the ratio of the modulated signal becomes larger, the directivity becomes higher. In contrast, as the ratio of the voice signal becomes larger, the directivity becomes lower. For example, if the ID (target audience) is closer to the position of the guiding device according to the aspect of the invention, by operating so as to lower the level of the modulated signal (directivity sound), and increase the level of the voice signal (low directivity sound), it is possible to prevent the voice guidance beam from being deviated from the target audience and provide an effective voice guidance in accordance with the movement of the audience.

Further, it is possible to adjust the directivity angle of the sound output in consideration of the attribute of the voice guidance information (contents).

In the guiding device according to the above aspect of the invention, the position identifying unit may generate the level ratio command on the basis of the ID information output from the ID identifying unit and the attribute information output from the attribute discriminating unit to output to the level adjusting unit, instead of generating the level ratio command by the attribute discriminating unit.

Therefore, the position identifying unit can generate the level ratio command changing the level ratio of the modulated signal and the voice signal on the basis of the ID information output from the ID identifying unit and the attribute information output from the attribute discriminating unit to output to the level adjusting unit.

As a result, it is possible to detect the position of the ID (target audience) by the position identifying unit and generate the level ratio command in accordance with the position and the attribute of the ID.

A method of controlling a guiding device according to an aspect of the invention may control the directivity of a sound that is to be reproduced from a speaker in accordance with an attribute of contents.

The method of controlling the guiding device with this process uses a speaker that is capable of simultaneously reproducing a sound having a directivity and a sound having no directivity (for example, a directional speaker that uses an ultrasonic transducer), and selects an operation mode that produces the sound having a directivity or an operation mode that produces the sound having no directivity in accordance with the attribute of the contents to be reproduced, and reproduces the sound having a directivity or the sound having no directivity. Therefore, it is possible to select a function of a directional speaker or a function of a loud speaker in accordance with the attribute of the voice guidance, as appropriate. As a result, the following advantages can be obtained. First, when providing guidance information, it is possible to prevent the confusion and erroneous assumption of the audience. Second, it is possible to provide the proper guidance for the target audience and thus the sense of security can be enhanced. Third, it is possible to reduce noise transmitted to the neighboring areas.

Further, since it is possible to realize a function of a directional speaker and a function of a loudspeaker using a single speaker, it is possible to reduce the size of the guiding device.

A method of controlling a guiding device according to another aspect of the invention includes generating and outputting an ultrasonic carrier wave, modulating the ultrasonic carrier wave generated by the generating of the carrier wave with the input audible voice signal, selecting and outputting the modulated signal output from the modulating of the ultrasonic carrier wave or the input voice signal, driving an ultrasonic transducer that is capable of being operated in both a first operation mode that reproduces a sound having a directivity and a second operation mode that reproduces a sound having no directivity by a signal output from the selecting of the modulated signal to reproduce a signal sound, and discriminating an attribute that receives voice guidance information including attribute data and voice data, outputs the voice data to the modulating and the selecting as a voice signal, discriminates the attribute of the voice guidance information, and controls the selecting of the modulated signal or the voice signal so as to select the first operation mode or the second operation mode in accordance with the attribute.

In the method of controlling a guiding device with these processes, an ultrasonic carrier wave is generated by the generating of the carrier wave. In the modulating, the ultrasonic carrier wave generated by the generating of the carrier wave is modulated with an input audible voice signal. In the selecting, the modulated signal output from the modulating or the input voice signal is selected to be output.

The ultrasonic transducer can be operated in both a first operation mode that reproduces a sound having a directivity and a second operation mode that reproduces a sound having no directivity, and is driven by a signal output from the selecting to reproduce a signal sound.

Further, in the discriminating of the attribute, voice guidance information that is contents including attribute data and voice data is input, the voice data is output to the modulating and the selecting as a voice signal, the attribute of the voice guidance information is discriminated, and the selecting of the modulated signal or the voice signal so as to select the signal supplied to the ultrasonic transducer by selecting the first operation mode or the second operation mode in accordance with the attribute is controlled.

Therefore, it is possible to select a function of a directional speaker or a function of a loud speaker in accordance with the attribute of the voice guidance, as appropriate. As a result, the following advantages can be obtained. First, when providing guidance information, it is possible to prevent the confusion and erroneous assumption of the audience. Second, it is possible to provide the proper guidance for the target audience and thus the sense of security can be enhanced. Third, it is possible to reduce noise transmitted to the neighboring areas.

Further, since it is possible to realize a function of a directional speaker and a function of a loudspeaker using a single speaker, it is possible to reduce the size of the guiding device.

A method of controlling a guiding device includes generating and outputting an ultrasonic carrier wave, modulating the ultrasonic carrier wave generated in the generating of the ultrasonic carrier wave with an input audible voice signal, adjusting a level ratio of the modulated signal output from the modulating of the ultrasonic carrier wave and the voice signal, discriminating an attribute that receives voice guidance information that is contents including attribute data and voice data, outputs the voice data to the modulating of the ultrasonic carrier wave and the adjusting of a level ratio as a voice signal, discriminates the attribute of the voice guidance information, and generates a level ratio command so as to change the level ratio of the modulated signal and the voice signal in accordance with the attribute to output to the adjusting of the level ratio, composing the modulated signal and the voice signal whose levels are adjusted by the adjusting of the level ratio to output a composite wave, and driving a transducer that is capable of reproducing both a sound having a directivity and a sound having no directivity by a signal output from the composing of the modulated signal to reproduce a signal sound.

In the method of controlling a guiding device with these processes, an ultrasonic carrier wave is generated by the generating of a carrier wave. In the modulating, the ultrasonic carrier wave generated by the generating of a carrier wave is modulated with an input audible voice signal.

In the adjusting of the level ratio, the level ratio of the modulated signal output from the modulating of the ultrasonic carrier wave and the voice signal output from the discriminating of an attribute is adjusted. Further, the discriminating of an attribute generates a level ratio command so as to change the level ratio of the modulated signal and the voice signal in accordance with the attribute information to control the adjusting of the level ratio. The composing of the modulated signal composes the modulated signal and the voice signal whose levels are adjusted by the adjusting of the level ratio to generate a composite wave. The ultrasonic transducer can reproduce both a sound having a directivity and a sound having no directivity and is driven by a signal output from the composing of the modulated signal to reproduce a signal sound.

Therefore, by adjusting the level ratio of the modulated signal and the voice signal, it is possible to change a directivity angle of the sound output. As the ratio of the modulated signal becomes larger, the directivity becomes higher. In contrast, as the ratio of the voice signal becomes larger, the directivity becomes lower. Further, it is possible to adjust the directivity angle of the sound output in consideration of the attribute of the voice guidance information (contents).

BRIEF DESCRIPTION OF THE DRAWINGS

The invention will be described with reference to the accompanying drawings, wherein like numbers reference like elements.

FIG. 5 is a view illustrating an example of contents of a voice guidance information database in the guiding device according to the second embodiment of this invention shown in FIG. 4.

DESCRIPTION OF EXEMPLARY EMBODIMENTS

Hereinafter, embodiments of this invention will be described with reference to accompanying drawings. A guiding device according to the embodiments of this invention has a first operation mode that reproduces a high directivity sound (a sound having a directivity) and a second operation mode that reproduces a low directivity sound (a sound having no directivity), includes a directivity speaker that is capable of simultaneously reproducing in both first and second modes, and provides voice guidance. The guiding device selects one of the first operation mode and the second operation mode and reproduces according to an attribute of a content (voice information) that is to be reproduced from the directional speaker.

Therefore, according to the embodiments of this invention, it is possible to provide voice guidance by selecting the first operation mode (directional speaker mode) or the second operation mode (loudspeaker mode) according to an attribute of a content (voice information) output from the directional speaker and a situation of target audience.

First Embodiment

Figure 1:
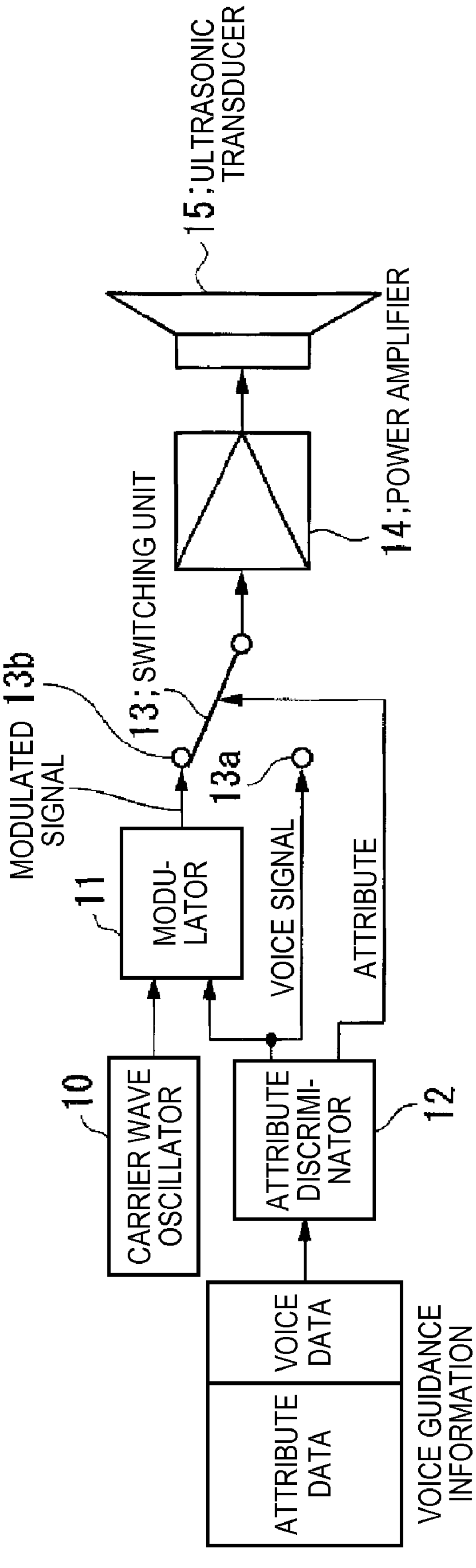
FIG. 1 is a block diagram showing a configuration of a guiding device according to a first embodiment of this invention.

FIG. 1 shows the configuration of a guiding device according to a first embodiment of this invention. As shown in FIG. 1, the guiding device according to the first embodiment of this invention includes a carrier waver oscillator 10, a modulator 11, an attribute discriminator 12, a switching unit 13, a power amplifier 14, and an ultrasonic transducer 15.

The carrier wave oscillator 10 generates an ultrasonic carrier wave.

The modulator 11 modulates the ultrasonic carrier wave output from the carrier wave oscillator 10 with an audible voice signal.

The switching unit 13 selects the modulated signal output from the modulator 11 or the input voice signal on the basis of an output of the attribute discriminator 12 which will be described below.

Voice guidance information that is contents including attribute data and voice data is input to the attribute discriminator 12. The attribute discriminator 12 outputs the voice data of the voice guidance information to the modulator 11 and the switching unit 13 as a voice signal, discriminates the attribute of the voice guidance information on the basis of the attribute data, and controls the switching unit 13 so as to select the first operation mode or the second operation mode according to the attribute to change a signal to be supplied to the ultrasonic transducer 15.

The power amplifier 14 amplifies an output power of the switching unit 13 to a predetermined level.

The ultrasonic transducer 15 is driven by a signal output from the power amplifier 14 to reproduce a signal sound.

The carrier wave oscillator 10 corresponds to the carrier wave generating unit according to the invention, the modulator 11 corresponds to the modulating unit according to the invention, and the attribute discriminator 12 corresponds to the attribute discriminating unit according to the invention.

With this configuration, an ultrasonic carrier wave is generated by the carrier wave oscillator 10 and then is input to one of input terminals of the modulator 11.

Meanwhile, voice guidance information (contents) including attribute data and voice data is input to the attribute discriminator 12, and the attribute discriminator 12 outputs the voice data of the voice guidance information to the other input terminal of the modulator 11 and a switching terminal 13*a* of the switching unit 13 as a voice signal.

The modulator 11 modulates the ultrasonic carrier wave that is output from the carrier wave oscillator 10 with the voice signal that is output from the attribute discriminator 12 to output the modulated signal to a switching terminal 13*b* of the switching unit 13.

Further, the attribute discriminator 12 discriminates the attribute of the voice guidance information on the basis of the attribute data among the voice guidance information, and controls the switching unit 13 so as to select one of a first operation mode that reproduces a high directivity sound according to the attribute or a second operation mode that reproduces a low directivity sound to select a signal to be supplied to the ultrasonic transducer 15.

In this embodiment, the voice guidance information (contents) has two types of private access right and public access right as attributes. If the voice guidance information is specific personal information, the access right is assigned to a private access right, and if the voice guidance information is public shared information, the access right is assigned to a public access right. In the case when the attribute of the voice guidance information is private, the sound reproduction is performed in the first mode, and in the case when the attribute of the voice guidance information is public, the sound reproduction is performed in the second mode.

That is, the switching unit 13 is controlled such that if the attribute data (access right) of the voice guidance information is private, the switching terminal 13*b* of the switching unit 13 is selected to reproduce in the first operation mode, and if the attribute data of the voice guidance information is public, the switching terminal 13*a* of the switching unit 13 is selected.

The modulated signal or the voice signal output from the switching unit 13 is amplified to a predetermined level by the power amplifier 14 and output to the ultrasonic transducer 15. The ultrasonic transducer 15 is driven by the output of the power amplifier 14 and reproduces the signal sound.

If the attribute of the voice guidance information is private, the voice guidance is announced only to a specific personal or a specific area, and if the attribute of the voice guidance information is public, the voice guidance can be announced in a relatively wide area.

According to the guiding apparatus of the first embodiment, it is possible to appropriately select the function of the directional speaker or the function of the loudspeaker according to the attribute of the voice guidance. Therefore, the following advantages may be obtained. First, it is possible to prevent the confusion and erroneous recognition of an audience. Second, it is possible to provide a proper guidance for a target audience. Third, the noise transmitted to the neighboring area can be reduced.

Further, it is possible to realize both functions of the directivity speaker and the loudspeaker using a single device, which can reduce the system size of the guiding device.

Figure 2A:
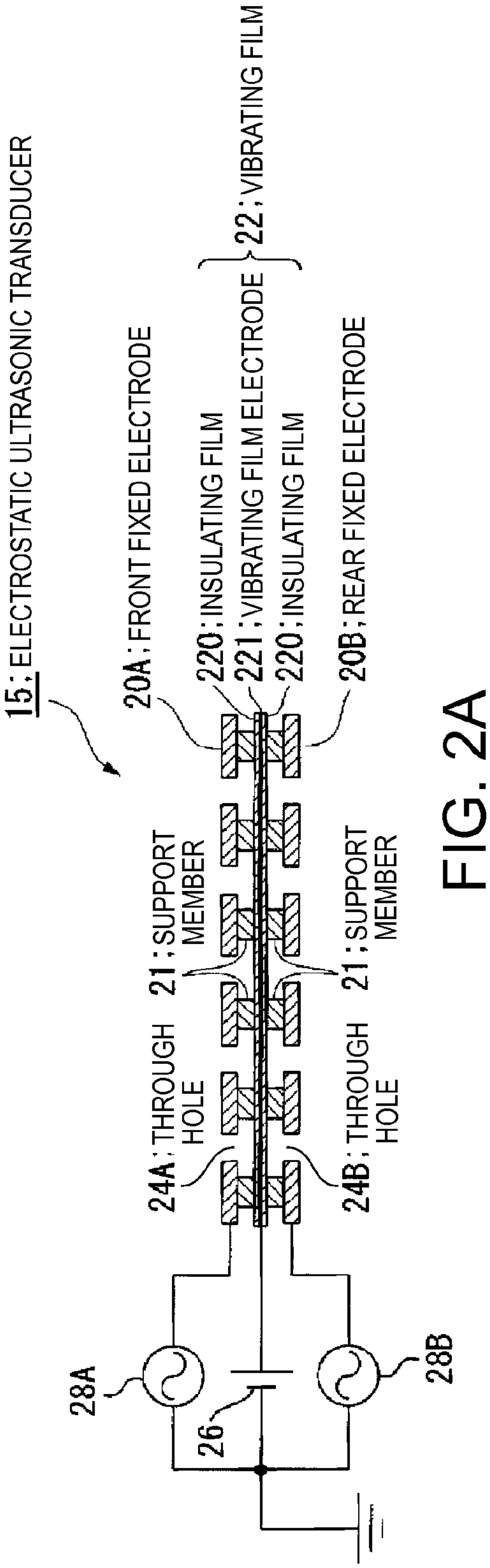
FIGS. 2A to 2C are views showing examples of a structure of an electrostatic ultrasonic transducer suitable for an ultrasonic transducer of a directional speaker apparatus according to embodiments of this invention.
Figure 2C:
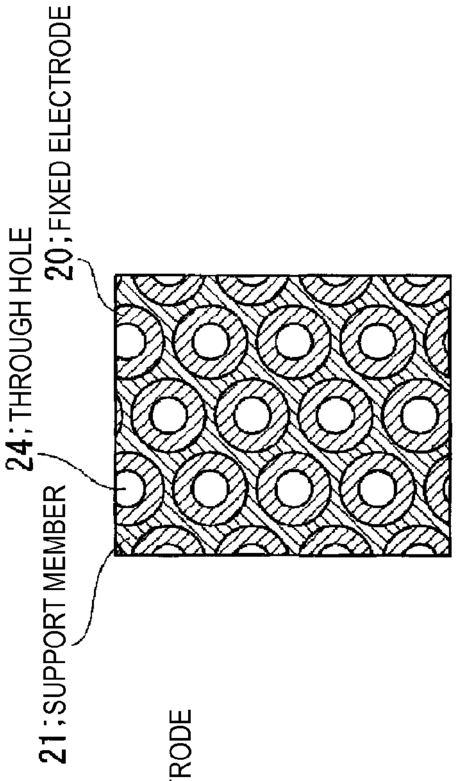
Figure 2B:
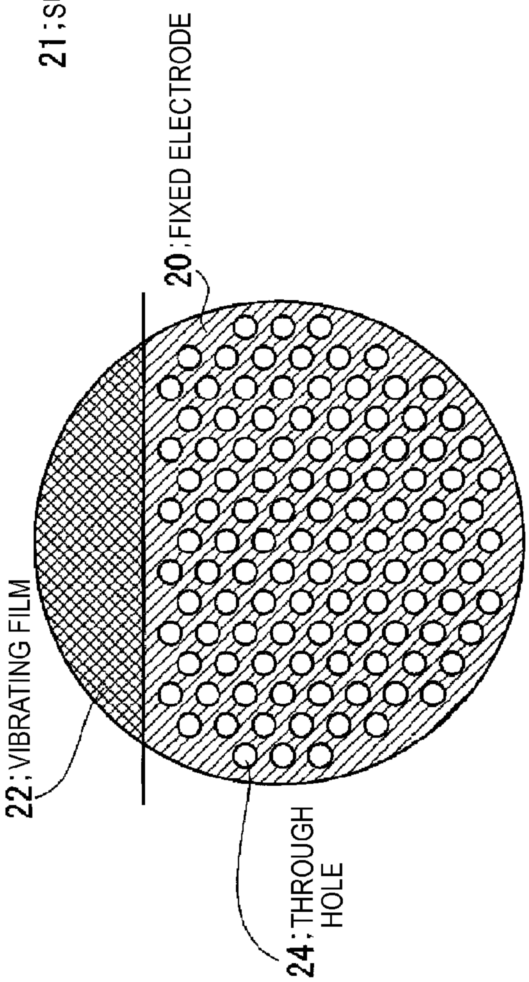

Next, FIGS. 2A to 2C show examples of a structure of an electrostatic ultrasonic transducer that is suitable for the ultrasonic transducer according to the embodiments of this invention.

FIG. 2A is a cross-sectional view of the electrostatic ultrasonic transducer 15 which includes a vibrating film 22 having a conductive layer (vibrating film electrode) 221, and a pair of fixed electrodes having a front fixed electrode 20A and a rear fixed electrode 20B that oppose surfaces of the vibrating film 22 (in the case of indicating both fixed electrodes, referred to as fixed electrodes 20). The vibrating film 22 may be formed so as to interpose the conductive layer (vibrating film electrode) 221 that forms an electrode as shown in FIG. 2A between the insulating films 220, or the entire vibrating film may be formed of a conductive material.

Further, a plurality of through holes 24A are formed in the front fixed electrode 20A that interposes the vibrating film 22, and a plurality of through holes 24B are formed in the rear fixed electrode 20B at positions corresponding to the positions of the through holes 24A of the frond fixed electrode 20A to have the same shape as the through holes of the frond fixed electrode (in the case of indicating both through holes 24A and 24B, referred to as through holes 24). The front fixed electrode 20A and the rear fixed electrode 20B are supported by a supporting member 21 so as to be spaced apart from the vibrating film 22 with a predetermined gap. As shown in FIG. 2A, the supporting member is formed so as to oppose the vibrating film 22 and the fixed electrodes 20 with a space therebetween. FIG. 2B shows an exterior plan view of one side of the electrostatic ultrasonic transducer 15 (in which a part of the fixed electrodes 20 is cut out), and the plurality of through holes 24 are arranged in a honeycomb shape. FIG. 2C is a plan view of the fixed electrodes to which the supporting member is bonded and shows a state where the fixed electrodes 20 are seen from the direction of the vibrating film 22 of the electrostatic ultrasonic transducer. The supporting member 21 is formed of an insulating material, for example, is formed such that the insulating member is patterned on the surface (a surface facing the vibrating film 22) of the fixed electrode 20 in a manner of resist printing of a printed board.

With this configuration, the front fixed electrode 20A and the rear fixed electrode 20B of the electrostatic ultrasonic transducer 15 are applied with alternating current signals 28A and 28B having the same amplitude whose phases are inversed from each other. Further, the vibrating electrode 221 is applied with a direct current bias voltage by a direct current power source 26. As such, the direct current bias voltage is applied to the vibrating film electrode 221, and driving signals (alternating current signals) having inverse phases from each other are applied to the front fixed electrode 20A and the rear fixed electrode 20B so that electrostatic attractive force and repulsive force simultaneously act on the vibrating film 22 in the same direction. Whenever the polarities of the driving signals (alternating current signals) are reversed, the direction of the electrostatic attractive force and the repulsive force is changed, and thus the vibrating film 22 is pushed or pulled. As a result, the sound wave generated from the vibrating film passes through the through holes 24 provided in the front fixed electrode 20A and the rear fixed electrode 20B to be emitted to the outside.

Figure 3:
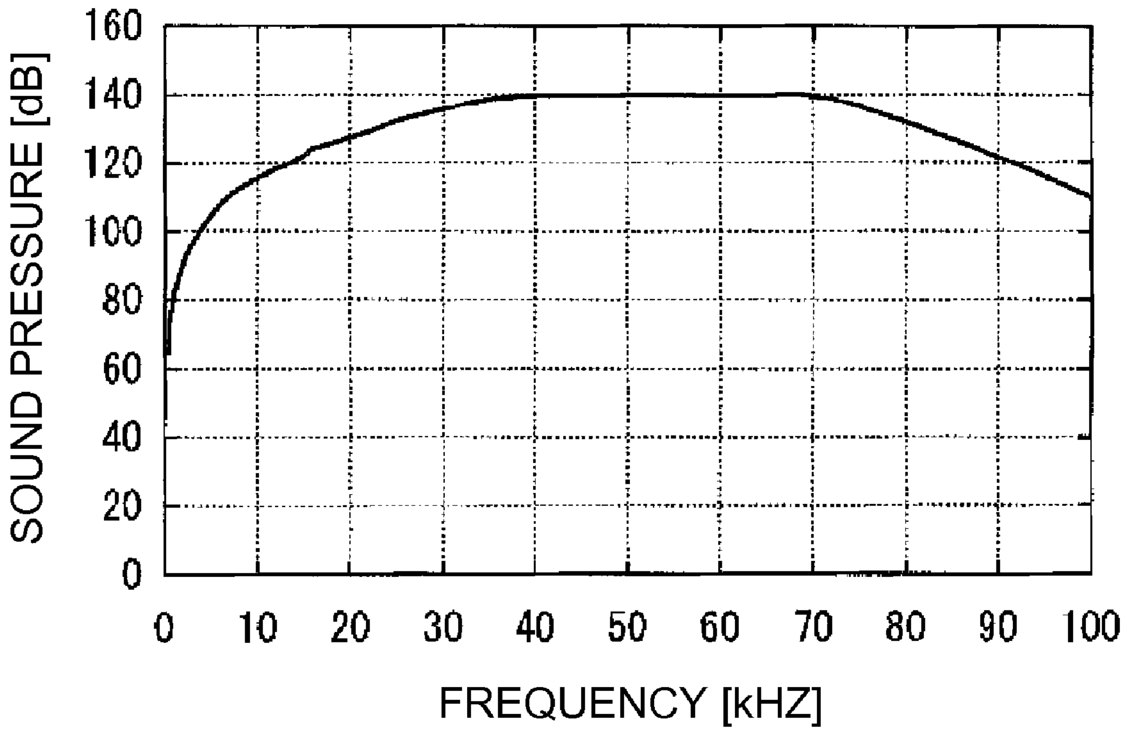
FIG. 3 is a characteristic view showing an example of a frequency characteristic of the electrostatic ultrasonic transducer.

As shown in FIG. 3, the above-described electrostatic transducer has a broad sound pressure-frequency characteristic in the ultrasonic frequency band. Therefore, since the frequency characteristic of the electrostatic ultrasonic transducer is not steeply changed which is different from the piezoelectric ultrasonic transducer, the electrostatic ultrasonic transducer has some sensitivities of sound pressure even in the audible frequency band as shown in FIG. 3. Therefore, if an audible signal is directly input to the electrostatic ultrasonic transducer, the electrostatic ultrasonic transducer functions as a loudspeaker that directly emits an audible sound.

Second Embodiment

Figure 4:
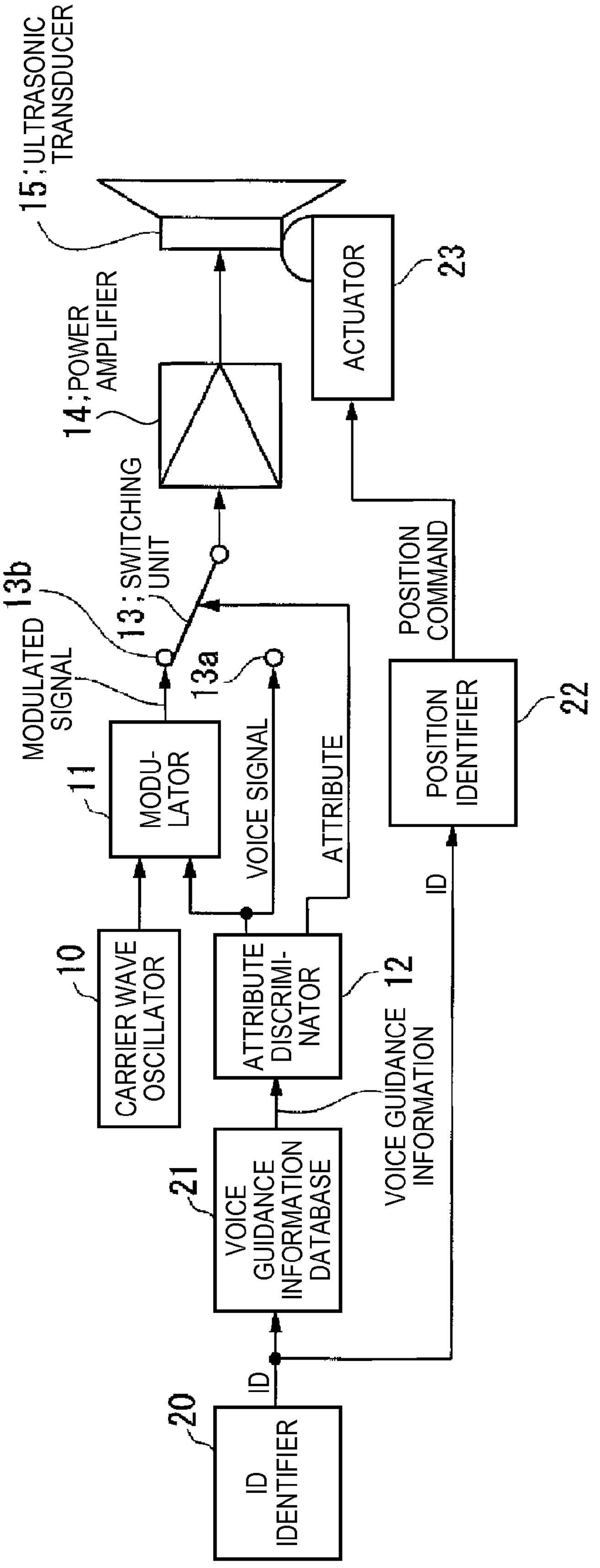
FIG. 4 is a block diagram showing a configuration of a guiding device according to a second embodiment of this invention.

FIG. 4 shows a configuration of a guiding device according to a second embodiment of this invention. The difference between the guiding device of the second embodiment and the guiding device of the first embodiment is that in addition to the components of the guiding device of the first embodiment shown in FIG. 1, an ID identifier 20, a position identifier 22, a voice guidance information database 21, and an actuator 23 are further provided, and the type and the position of providing a voice guidance can be appropriately changed in accordance to an attribute of the identified ID and the position of the ID. The remaining configuration is the same as that of the guiding device of the first embodiment, like reference numerals will denote like components, and the description thereof will be omitted.

The guiding device according to the second embodiment of the invention includes a carrier wave oscillator 10, a modulator 11, an attribute discriminator 12, a switching unit 13, a power amplifier 14, an ultrasonic transducer 15, the ID discriminator 20, the position discriminator 22, the voice guidance information database 21, and the actuator 23.

The ID identifier 20 is configured by an RF-ID identifier, a wireless LAN, etc. and identifies a personal ID or a specific area.

The position identifier 22 identifies or calculates the position of the ID that is identified by the ID identifier 20 to output a position command to the actuator which will be described below. For example, when a plurality of RF-ID reading terminal are provided (for example, ticket gates), the position of the reading terminals is previously registered in the position identifier, then, a terminal that has performed the readout operation is identified and then the position of the terminal is informed to the actuator. Otherwise, it is further possible to identify the position by measuring an area where the ID (for example, a portable terminal) is present by means of the wireless LAN.

In the voice guidance information database 21, voice guidance information that is previously associated with each of the IDs is stored, and the voice guidance information database 21 is configured so as to output voice guidance information that corresponds to an ID identified by the ID identifier 20 to the attribute discriminator 12. FIG. 5 shows an example of the voice guidance information database 21 in which data indicating IDs, attribute data of the voice guidance information, and voice data to be output are associated with each other and stored.

The actuator 23 has a function of controlling a sound emitting direction of the ultrasonic transducer 15, and is configured to control and drive the ultrasonic transducer 15 so as to match the sound emitting direction of the ultrasonic transducer 15 with the position where the ID identified by the ID identifier 20 is present, on the basis of the position command output from the position identifier 22.

That is, the actuator 23 is configured to control a sound wave emitting direction of the ultrasonic transducer 15 such that the sound wave (especially, directivity sound) reaches the position where the ID is present, on the basis of the position command output from the position identifier 22.

Further, the ID identifier 20, the voice guidance information database 21, and the position identifier 22 correspond to the ID identifying unit, the voice guidance information outputting unit, and the position identifying unit of the invention, respectively.

In the above configuration, an ultrasonic carrier wave is generated by the carrier wave oscillator 10 and input to one of input terminals of the modulator 11.

In the meantime, the ID identifier 20 identifies a personal ID or an ID for a specific area, and outputs data indicating the IDs to the voice guidance information database 21 and the position identifier 22.

The voice guidance information database 21 outputs voice guidance information including attribute data corresponding to the ID that is identified by the ID identifier 20 and voice data to the attribute discriminator 12. The attribute discriminator 12 outputs the voice data among the voice guidance information to the other input terminal of the modulator 11 and the switching terminal 13*a* of the switching unit 13 as a voice signal.

The modulator 11 modulates the ultrasonic carrier wave output from the carrier wave oscillator 10 with the voice signal output from the attribute discriminator 12, and outputs the modulated signal to the switching terminal 13*b* of the switching unit 13.

The attribute discriminator 12 discriminates the attribute of the voice guidance information on the basis of the attribute data among the voice guidance information, and controls the switching unit 13 so as to select a first operation mode that reproduces a high directivity sound or a second operation mode that reproduces a low directivity sound according to the attribute to change a signal to be supplied to the ultrasonic transducer 15.

The position identifier 22 identifies the position where the ID identified by the ID identifier 20 is present, and outputs the position command to the actuator 23 that controls the sound emitting direction of the ultrasonic transducer 15.

The actuator 23 drives and controls the ultrasonic transducer 15 so as to match the sound emitting direction of the ultrasonic transducer 15 with a direction of the position where the ID identified by the ID identifier 20 is present, on the basis of the position command output from the position identifier 22.

According to the guiding device according to the second embodiment of this invention, it is possible to allow a voice guidance beam to precisely follow the target audience in accordance with the movement of the target audience, and thus it is possible to effectively provide the voice guidance.

However, since the sound that is reproduced in the first operation mode (directional speaker mode) has very sharp directivity, an area where the voice guidance can be reached is very narrow. As the target audience is closer to the guiding device, the area where the voice guidance can be reached becomes narrower. Therefore, if the target is relatively close to the guiding device, the voice guidance beam may be deviated from the target audience. Further, in the directional speaker that uses a parametric array phenomenon, a predetermined distance for the self demodulation is required. Therefore, there is a problem in that the level of the reproduction sound pressure becomes smaller around the speaker.

Third Embodiment

A guiding device according to a third embodiment of this invention is configured to change the level ratio of a sound that is output in a first operation mode (directional speaker mode) and a sound that is output in a second operation mode (loudspeaker mode (low directivity) mode) to output the signal.

Figure 6:
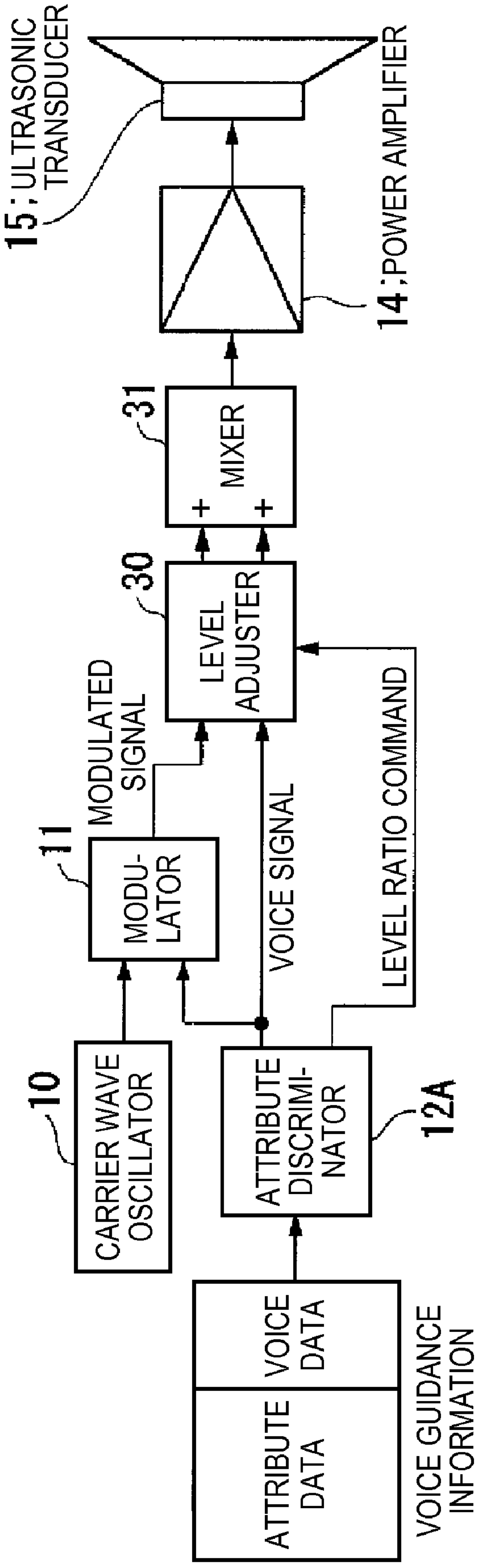
FIG. 6 is a block diagram showing a configuration of a guiding device according to a third embodiment of this invention.

The configuration of the guiding device according to the third embodiment of this invention is shown in FIG. 6. The difference in configuration between the guiding device of the third embodiment and the guiding device of the first embodiment is that instead of the switching unit 13 in the configuration of the guiding device according to the first embodiment shown in FIG. 1, the guiding device according to the third embodiment includes a level adjuster 30 that adjusts the level ratio of a modulation signal output from the modulator 11 and a voice signal output from an attribute discriminator 12A, and a mixer 31 that composes the modulated signal and the voice signal whose levels are adjusted by the level adjuster 30 to generate a composite wave and outputs to the ultrasonic transducer 15 through the power amplifier 14. Further, the attribute discriminator 12A generates a level ratio command so as to change the level ratio of the modulated signal and the voice signal on the basis of attribute information and outputs to the level adjuster 30. The remaining configuration is the same as that of the guiding device of the first embodiment, like reference numerals will denote like components, and the description thereof will be omitted.

Further, the level adjuster 30 corresponds to the level adjusting unit according to the invention.

With this configuration, the attribute discriminator 12A generates the level ratio command so as to change the level ratio of the modulated signal and the voice signal on the basis of the attribute information and outputs to the level adjuster 30.

As a result, the level adjuster 30 adjusts the level ratio of the modulated signal output from the modulator 11 and the voice signal output from the attribute discriminator 12A and the mixer 31 composes the modulated signal and the voice signal whose levels are adjusted by the level adjuster 30 to generate a composite wave and outputs to the ultrasonic transducer 15 through the power amplifier 14.

According to the guiding device according to the third embodiment, by adjusting the level ratio of the modulated signal and the voice signal, it is possible to change a directivity angle of the sound output. As the ratio of the modulated signal becomes larger, the directivity becomes higher. In contrast, as the ratio of the voice signal becomes larger, the directivity becomes lower.

For example, by operating so as to decrease the level of the modulated signal (directivity sound) and increase the level of the voice signal (low directivity sound) in accordance with the number of the target audiences and objects, it is possible to provide an effect voice guidance. Further, if the composite level ratio of the modulated signal and the voice signal is 1:0, the guiding device functions as a genuine directional speaker, and if the ratio is 0:1, the guiding device functions as a genuine loudspeaker.

Fourth Embodiment

A guiding device according to a fourth embodiment of this invention is configured to change the level ratio of a sound that is output in a first operation mode (directional speaker mode) and a sound that is output in a second operation mode (loudspeaker (low directivity) mode) and output in accordance with a position of the identified ID. Further, the guiding device according to the fourth embodiment of this invention is configured to appropriately change the type and the direction of the voice guidance to be provided in accordance with the attribute of the identified ID and the position where the ID is present.

Figure 7:
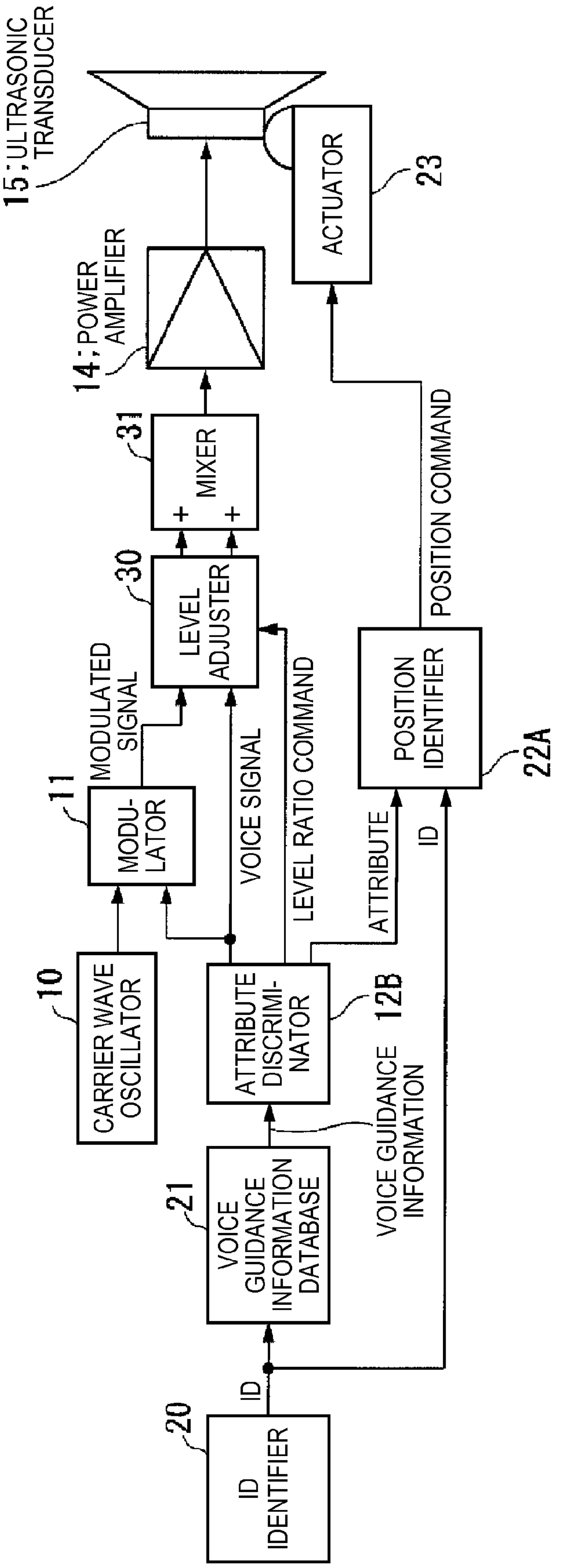
FIG. 7 is a block diagram showing a configuration of a guiding device according to a fourth embodiment of this invention.

FIG. 7 shows a configuration of a guiding device according to a fourth embodiment of this invention. The difference between the guiding device of the third embodiment and the guiding device of the fourth embodiment is that in addition to the components of the guiding device according to the third embodiment shown in FIG. 6, an ID identifier 20, a position identifier 22A, a voice guidance information database 21, and an actuator 23 are further provided, and the type and the position of providing the voice guidance can be appropriately changed in accordance to an attribute of the identified ID and the position of the ID. The remaining configuration is the same as that of the guiding device of the third embodiment, like reference numerals will denote like components, and the description thereof will be omitted.

The guiding device according to the fourth embodiment of the invention includes a carrier wave oscillator 10, a modulator 11, an attribute discriminator 12B, a level adjuster 30, a mixer 31, a power amplifier 14, an ultrasonic transducer 15, the ID discriminator 20, the voice guidance information database 21, the position discriminator 22A, and the actuator 23.

The ID identifier 20 is configured by an RF-ID identifier, a wireless LAN, etc. and identifies a personal ID or a specific area.

The position identifier 22A identifies or calculates the position of the ID that is identified by the ID identifier 20 to output a position command to the actuator which will be described below. For example, when a plurality of RF-ID reading terminal are provided (for example, ticket gates), the position of the reading terminals is previously registered in the position identifier, then, a terminal that has performed the readout operation is identified and then the position of the terminal is informed to the actuator. Otherwise, it is further possible to identify the position by measuring an area where the ID (for example, a portable terminal) is present by means of the wireless LAN.

In the voice guidance information database 21, voice guidance information that is previously associated with each of the IDs is stored, and the voice guidance information database 21 is configured so as to output voice guidance information that corresponds to an ID identified by the ID identifier 20 to the attribute discriminator 12B. FIG. 5 shows an example of the voice guidance information database 21 in which data indicating IDs, attribute data of the voice guidance information, and voice data to be output are associated with each other and stored.

The actuator 23 has a function of controlling a sound emitting direction of the ultrasonic transducer 15, and is configured to control and drive the ultrasonic transducer 15 so as to match the sound emitting direction of the ultrasonic transducer 15 with the position where the ID identified by the ID identifier 20 is present, on the basis of the position command output from the position identifier 22A.

That is, the actuator 23 is configured to control a sound wave emitting direction of the ultrasonic transducer 15 such that the sound wave (especially, directivity sound) reaches the position where the ID is present, on the basis of the position command output from the position identifier 22A.

In the above configuration, an ultrasonic carrier wave is generated by the carrier wave oscillator 10 and input to one of input terminals of the modulator 11. The attribute discriminator 12B discriminates the attribute of the voice guidance information on the basis of the attribute data among the voice guidance information and generates a level ratio command so as to change the level ratio of the modulated signal and the voice signal according to the attribute and outputs to the level adjuster 30.

As a result, the level adjuster 30 adjusts the level ratio of the modulated signal output from the modulator 11 and the voice signal output from the attribute discriminator 12B and the mixer 31 composes the modulated signal and the voice signal whose levels are adjusted by the level adjuster 30 to generate a composite wave and outputs to the ultrasonic transducer 15 through the power amplifier 14.

The ID identifier 20 identifies a personal ID or an ID for a specific area, and outputs data indicating the IDs to the voice guidance information database 21 and the position identifier 22A.

The position identifier 22A identifies the position where the ID identified by the ID identifier 20 is present, and outputs the position command to the actuator 23 that controls the sound emitting direction of the ultrasonic transducer 15.

The actuator 23 drives and controls the ultrasonic transducer 15 so as to match the sound emitting direction of the ultrasonic transducer 15 with a direction of the position where the ID identified by the ID identifier 20 is present, on the basis of the position command output from the position identifier 22A.

According to the guiding device according to the fourth embodiment of this invention, it is possible to allow a voice guidance beam to precisely follow the target audience in accordance with the movement of the target audience, and thus it is possible to effectively provide the voice guidance. Further, by adjusting the level ratio of the modulated signal and the voice signal, it is possible to change a directivity angle of the sound output. (As the ratio of the modulated signal becomes larger, the directivity becomes higher. In contrast, as the ratio of the voice signal becomes larger, the directivity becomes lower.)

Fifth Embodiment

A guiding device according to a fifth embodiment of this invention is configured to change the level ratio of a sound that is output in a first operation mode (directional speaker mode) and a sound that is output in a second operation mode (loudspeaker (low directivity) mode) and output in accordance with a position of the identified ID. Further, the guiding device according to the fifth embodiment of this invention is configured to appropriately change the type and the direction of the voice guidance to be provided in accordance with the attribute of the identified ID and the position where the ID is present.

Figure 8:
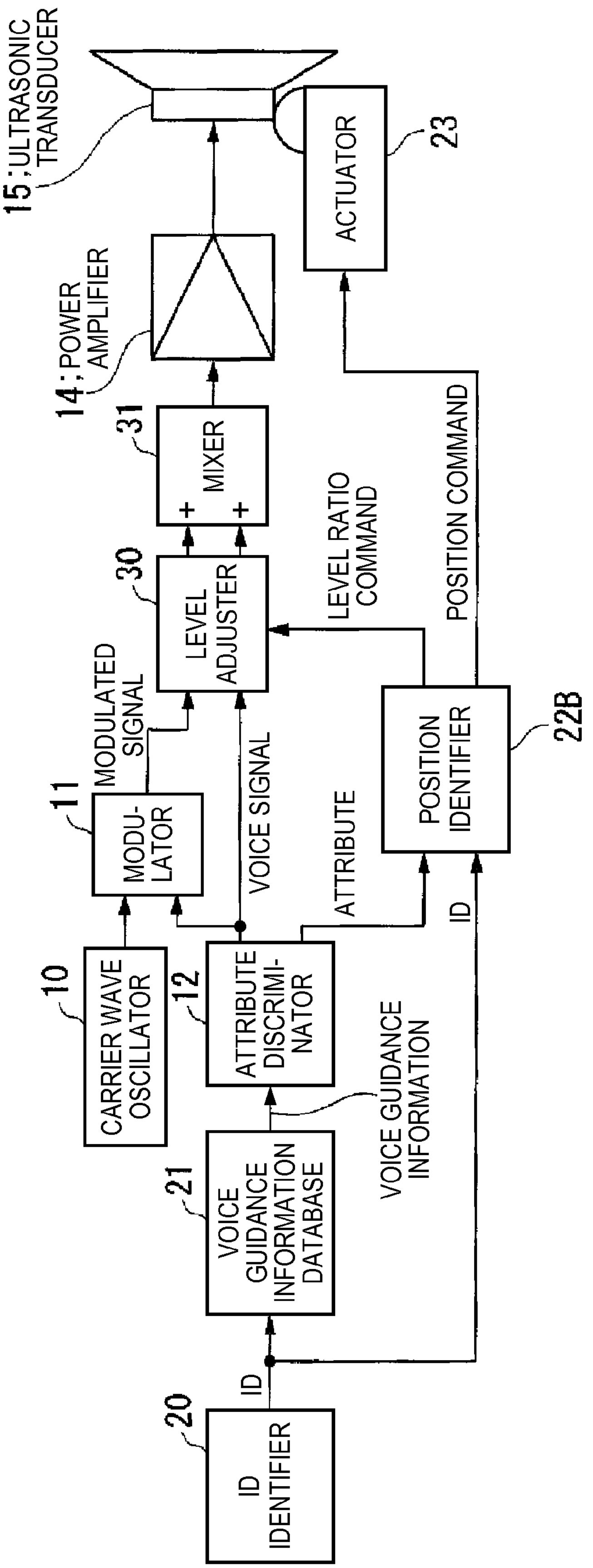
FIG. 8 is a block diagram showing a configuration of a guiding device according to a fifth embodiment of this invention.

FIG. 8 shows a configuration of a guiding device according to a fifth embodiment of this invention. The difference between the guiding device of the second embodiment and the guiding device of the fifth embodiment is that in the configuration of the guiding device according to the fourth embodiment shown in FIG. 7, the position identifier 22B is configured to generate a level ratio command so as to change the level ratio of the modulated signal and the voice signal on the basis of the ID information output from the ID identifier 20 and the attribute information output from the attribute discriminator 12 and output to the level adjuster 30. The remaining configuration is the same as that of the guiding device of the fourth embodiment, like reference numerals will denote like components, and the description thereof will be omitted.

In the above configuration, the position identifier 22B is configured to generate a level ratio command so as to change the level ratio of the modulated signal and the voice signal on the basis of the ID information output from the ID identifier 20 and the attribute information output from the attribute discriminator 12 and output to the level adjuster 30.

As a result, the level adjuster 30 adjusts the level ratio of the modulated signal output from the modulator 11 and the voice signal output from the attribute discriminator 12 and the mixer 31 composes the modulated signal and the voice signal whose levels are adjusted by the level adjuster 30 to generate a composite wave and outputs to the ultrasonic transducer 15 through the power amplifier 14.

According to the guiding device according to the fifth embodiment of the invention, by adjusting the level ratio of the modulated signal and the voice signal, it is possible to change a directivity angle of the sound output. As the ratio of the modulated signal becomes larger, the directivity becomes higher. In contrast, as the ratio of the voice signal becomes larger, the directivity becomes lower.

For example, as the ID (target audience) is closer to the position of the guiding device according to the aspect of the invention, by operating so as to decrease the level of the modulated signal (directivity sound) and increase the level of the voice signal (low directivity sound), it is possible to allow a voice guidance beam to precisely follow the target audience in accordance with the movement of the target audience, and thus it is possible to effectively provide the voice guidance. Further, if the composite level ratio of the modulated signal and the voice signal is 1:0, the guiding device functions as a genuine directional speaker, and if the ratio is 0:1, the guiding device functions as a genuine loudspeaker.

Furthermore, it is possible to change a directivity angle of the sound output in consideration of the attribute of the voice guidance information (contents)

While preferred embodiments of this invention have been described, the guiding device according to the embodiment of this invention is not limited to the above illustrated embodiments, and it is to be understood that changes and variations may be made without departing from the sprit or scope of the following claims.

The entire disclosure of Japanese Patent Application Nos: 2006-068816, filed Mar. 14, 2006 and 2007-032556, filed Feb. 13, 2007 are expressly incorporated by reference herein.

What is claimed is:

1. A guiding device comprising:

a carrier wave generating unit that generates and outputs an ultrasonic carrier wave;

a modulating unit that modulates the ultrasonic carrier wave output from the carrier wave generating unit with an input audible voice signal;

a switching unit that selects and outputs the modulated signal output from the modulating unit or the input voice signal;

an ultrasonic transducer that is capable of being operated in both a first operation mode that reproduces a sound having a directivity and a second operation mode that reproduces a sound having no directivity, and is driven by a signal output from the switching unit to reproduce a signal sound; and an attribute discriminating unit that receives voice guidance information including attribute data and voice data, outputs the voice data to the modulating unit and the switching unit as a voice signal, discriminates the attribute of the voice guidance information, and controls the switching unit so as to select the first operation mode or the second operation mode In accordance with the attribute.

2. The guiding device according to claim 1, further comprising:

an ID identifying unit that identifies a personal ID or an ID for a specific area;

a voice guidance information outputting unit that stores the voice guidance information that is previously associated with each of the IDs, and outputs the voice guidance information that corresponds to an ID identified by the ID identifying unit to the attribute discriminating unit;

a position identifying unit that identifies the position where the ID identified by the ID identifying unit is present, and outputs the position command; and an actuator that controls so as to match a sound emitting direction of the ultrasonic transducer with the position where the ID identified by the ID identifying unit is present, on the basis of the position command output from the position identifying unit.

3. A guiding device comprising:

a carrier wave generating unit that generates and outputs an ultrasonic carrier wave;

a modulating unit that modulates the ultrasonic carrier wave output from the carrier wave generating unit with an input audible voice signal;

a level adjusting unit that adjusts a level ratio of the modulated signal output from the modulating unit and the voice signal;

an attribute discriminating unit that receives voice guidance information that is contents including attribute data and voice data, outputs the voice data to the modulating unit and the level adjusting unit as a voice signal, discriminates the attribute of the voice guidance information, and generates a level ratio command so as to change the level ratio of the modulated signal and the voice signal in accordance with the attribute information, and outputs the level ratio command to the level adjusting unit;

a mixer that composes the modulated signal and the voice signal whose levels are adjusted by the level adjusting unit, and outputs a composite wave; and an ultrasonic transducer that is capable of reproducing both a sound having a directivity and a sound having no directivity, and is driven by a signal output from the mixer to reproduce a signal sound.

4. The guiding device according to claim 3, further comprising:

an ID identifying unit that identifies a personal ID or an ID for a specific area;

a voice guidance information outputting unit that stores the voice guidance information that is previously associated with each of the IDs, and outputs the voice guidance information that corresponds to an ID identified by the ID identifying unit to the attribute discriminating unit;

a position identifying unit that identifies the position where the ID identified by the ID identifying unit is present, and outputs a position command; and an actuator that controls so as to match a sound emitting direction of the ultrasonic transducer with the position where the ID identified by the ID identifying unit is present, on the basis of the position command output from the position identifying unit.

5. The guiding device according to claim 4, wherein the position identifying unit generates the level ratio command on the basis of the ID information output from the ID identifying unit and the attribute information output from the attribute discriminating unit to output to the level adjusting unit, instead of generating the level ratio command by the attribute discriminating unit.

* * * * *